United States Patent
Stoupis et al.

(10) Patent No.: US 8,621,117 B2
(45) Date of Patent: Dec. 31, 2013

(54) INTELLIGENT CONFIGURATION SYSTEM FOR POWER DISTRIBUTION FEEDER RECLOSERS AND SWITCHES

(75) Inventors: James Stoupis, Raleigh, NC (US); Donato Colonna, Raleigh, NC (US); Kornel Scherrer, Oberwil-Lleli (CH); David Lubkeman, Cary, NC (US)

(73) Assignee: ABB Research Ltd., Zurich (CH)

( * ) Notice: Subject to any disclaimer, the term of this patent is extended or adjusted under 35 U.S.C. 154(b) by 2298 days.

(21) Appl. No.: 10/998,845

(22) Filed: Nov. 30, 2004

(65) Prior Publication Data

US 2006/0116794 A1    Jun. 1, 2006

(51) Int. Cl.
G06F 3/00    (2006.01)
(52) U.S. Cl.
USPC .......................................................... 710/10
(58) Field of Classification Search
None
See application file for complete search history.

(56) References Cited

U.S. PATENT DOCUMENTS

| | | | |
|---|---|---|---|
| 5,568,399 A * | 10/1996 | Sumic | 700/293 |
| 5,872,722 A | 2/1999 | Oravetz | |
| 5,963,734 A * | 10/1999 | Ackerman et al. | 703/18 |
| 5,978,784 A | 11/1999 | Fagg | |
| 5,987,393 A | 11/1999 | Stinson | |
| 6,121,886 A | 9/2000 | Andersen | |
| 6,377,283 B1 | 4/2002 | Thomas | |
| 6,801,920 B1 | 10/2004 | Wischinski | |
| 6,853,978 B2 | 2/2005 | Forth et al. | |
| 6,985,784 B2 | 1/2006 | Vandevanter et al. | |
| 2002/0054096 A1 | 5/2002 | Thomas | |
| 2002/0120723 A1 * | 8/2002 | Forth et al. | 709/221 |
| 2002/0173927 A1 * | 11/2002 | Vandiver | 702/122 |
| 2004/0236620 A1 | 11/2004 | Chauhan | |
| 2005/0097373 A1 | 5/2005 | Stoupis et al. | |

FOREIGN PATENT DOCUMENTS

WO PCT/US2005/043089    1/2007

OTHER PUBLICATIONS

Distributed Power Quality Monitoring Using Object Oriented IEDs (Intelligent Electronic Devices), Power Quality Solutions, Sep. 1995 Proceedings, pp. 127-132.
Substation Automation and Integration—From Relays to Desktops, Paul Elkin et al., Western Power Delivery Automation Conference, Spokane, Washington, Apr. 2000, pp. 1-23.
Helping Utilities Harness the Power of the Web for Substation Automation, Dale Finney, Electricity Today, vol. 12, No. 8, Oct.-Nov. 2000 pp. 24, 27.
Internet Helps Utilities Bridge Knowledge Gaps, Bill Koch, Electrical World, Jan./Feb. 2001, vol. 215 Issue 1, pp. 33-35.

(Continued)

Primary Examiner — Henry Tsai
Assistant Examiner — Aurangzeb Hassan
(74) Attorney, Agent, or Firm — Paul R. Katterle; Burns, Doane, Swecker & Mathis, L.L.P.

(57) ABSTRACT

An exemplary method for configuring an intelligent electronic device in a power delivery system includes receiving identification data for the intelligent electronic device, based on the received identification data and on capabilities of the intelligent electronic device, generating a configuration profile for the intelligent electronic device, receiving operating parameters for the intelligent electronic device, determining a coordination of the intelligent electronic device with the power delivery system based on the received operating parameters, displaying the determined coordination, modifying the configuration profile based on the received operating parameters and the determined coordination, and configuring the intelligent electronic device with the modified configuration profile.

20 Claims, 14 Drawing Sheets

(56) References Cited

OTHER PUBLICATIONS

Intelligent Information Retrieval and Fault Classification in Distribution Substations Using a Rough Set Approach, Ching-Lai Hor et al., Power System Management and Control, Apr. 17-19, 2002, Conference Publication No. 488, IEE 2002, pp. 432-438.

Protection Coordination Analysis of Closed-Loop Distribution System, Kun-Yuan Shen et al., IEEE Doc. No. 0-7803-7459-2/02, pp. 702-706, 2002.

The Role of Interfaces in Supervisory Systems, James W. Evans et al., ISSN 0895-0156/93, IEEE Computer Applications in Power, Apr. 1993, pp. 35-39.

* cited by examiner

Figure 6

Intelligent Configurator - Protection Coordination

Application Query

What type of curve set do you want to use for the recloser protection settings?

○ ANSI

○ IEC

⦿ Recloser

Note:

Recloser curves are most commonly used for midpoint recloser applications whereas ANSI can be used for substation recloser applications. IEC is typically only used in Europe and other parts of the world.

Summary of Query Answers

Fuse saving
3 slow operations

[Back] [Continue]

Figure 7

Intelligent Configurator - Protection Coordination

Application Query

Enter the percentages of load current at the recloser location for phase and ground pickups.

Phase pickup = 1 load X [200]

Ground pickup = 1 load X [75]

Note:

Enter integer values into the boxes. Many utilities set the phase pickup at 150-200% and the ground pickup at 50-100% of load current at the recloser location.

Summary of Query Answers

Fuse saving
3 slow operations
Recloser curves selected

Pct. of load selected

[Back] [Continue]

Figure 8

Intelligent Configurator - Protection Coordination

Coordination Analysis

Breaker to midpoint recloser coordination successful
Breaker to fuse 1 coordination successful
Midpoint recloser to fuse 2 slow curve coordination unsuccessful
Midpoint recloser to fuse 2 fast curve coordination unsuccessful

Summary of Query Answers

Fuse saving
3 slow operations
Recloser curves selected

Pct. of load selected
Phase pu: 200% load
Ground pu: 75% load

Chosen Protection Settings

Recloser 51P Pickup: 800
Recloser 51P Curve: B
Recloser 51P Time Dial/Multiplier: 1
Recloser 50P-1 Pickup: 800
Recloser 50P-1 Curve: A
Recloser 50P-1 Time Dial/Multiplier: 0.2

Chosen Recloser Settings

Recloser 79-1 Open Time: 0.5 sec
Recloser 79-2 Open Time: 2 sec
Recloser 79-3 Open Time: 15 sec
Recloser 79-4 Open Time: 30 sec
Recloser 79-5 Open Time: Lockout
Recloser Reset Time: 60 sec

[Back] [Save Settings] [End Program]

Figure 10

| Protection Simulator | | | |
|---|---|---|---|
| Input | Search | Plot | |

Search Options

Date: Between `Monday, January 01,1990` ▶ `12:00:00 AM`
and `Wednesday, September 08, 2004` ▶ `9:50:35 AM`

Type:
- Sensitive Earth Ground ☑
- Line to Ground ☑
- Line to Line Ground ☑
- Line to Line ☑
- Three-Phase ☑

Phases:
- A ☑
- B ☑
- C ☑
- N ☑

Lockout ☑

[ Search for all events ]

Elements:
- ☑ 50N
- ☑ 51N
- ☑ 50P
- ☑ 51P
- ☑ 46
- ☑ 67N
- ☑ 67P
- ☑ 81
- ☑ 27
- ☑ 59
- ☑ 32N
- ☑ 32P
- ☑ Cold Load Time
- ☑ Neutral Cold Load Time
- ☑ Two-Phase 50P Tripping

[ Select all elements ]
[ Toggle element selections ]

[ Search ]

Event Records

| Date | Time | Fault Type | Tripping |
|---|---|---|---|
| 5/8/2004 | 10:55:56 PM | Sensitive Earth Ground Fault | 51P |
| 5/31/2004 | 5:40:58 PM | Line to Ground Fault | 50N-1 |
| 6/14/2004 | 2:41:11 PM | Line to Ground Fault | 50N-1 |
| 6/23/2004 | 11:06:54 PM | Line to Ground Fault | 51P |
| 6/24/2004 | 12:55:28 AM | Line to Ground Fault | 51P |
| 6/25/2004 | 1:48:35 AM | Line to Ground Fault | 51P |
| 6/25/2004 | 4:32:25 AM | Line to Ground Fault | 51P |
| 7/22/2004 | 12:41:01 PM | Line to Ground Fault | 50P-1 |
| 8/2/2004 | 3:12:49 PM | Line to Line Fault | 50P-1 |
| 8/2/2004 | 3:13:57 PM | Line to Line Fault | 50P-1 |
| 8/2/2004 | 3:33:43 PM | Line to Line Fault | 50P-1 |
| 8/2/2004 | 3:37:19 PM | Line to Line Fault | 50P-1 |
| 8/2/2004 | 4:23:18 PM | Line to Line Fault | 50P-1 |
| 8/2/2004 | 4:24:28 PM | Line to Line Fault | 50P-1 |
| 8/4/2004 | 6:03:27 AM | Line to Ground Fault | 50N-1 |

Figure 12

INTELLIGENT CONFIGURATION SYSTEM FOR POWER DISTRIBUTION FEEDER RECLOSERS AND SWITCHES

RELATED APPLICATIONS

U.S. application Ser. No. 10/699,920 and U.S. applications corresponding to ABB Inc. reference numbers B030460, B030470, B030230, and B020360 are hereby incorporated by reference.

BACKGROUND INFORMATION

Reclosers and switches currently used for outdoor power distribution systems include sophisticated protection and control electronics that need to be configured extensively for specific customer applications. Large utilities maintain a small number of application engineering experts that have the knowledge and expertise to configure these devices. However, a large number of potential customers, such as small municipal utilities or co-ops, do not have the requisite knowledge and capability to configure such sophisticated devices. Consequently small utilities and co-ops can be reluctant to introduce more sophisticated power system applications that might improve their services. Large utilities may experience similar problems.

Even for the larger utility customers, the range of features available for feeder automation communications and protection can be overwhelming. Many power protection engineers do not have the necessary knowledge to properly configure the newer communication schemes now available for feeder automation. Furthermore, many of the protection and monitoring functions are not applied, since users do not know how to set them up.

In the past, distribution protection devices, such as hydraulic reclosers, were fairly simple to set up. With today's more sophisticated feeder automation systems, utilities now need to have expertise in the areas of distribution protection, operations and communications. As utilities continue to cut costs and as experienced engineers retire, more of the functions typically performed by more experienced engineers are delegated to entry-level engineers and technicians. Another problem is that engineers and technicians may be unfamiliar with functionality of the intelligent electronic devices they are configuring and operating, and may underutilize capabilities of the devices.

An existing method for setting a protection device involves a utility engineer determining the appropriate protection curve settings for each device on a distribution feeder, the engineer entering those settings into a settings software tool, and downloading the settings to each respective intelligent electronic device (IED) on the distribution feeder. The utility engineer can use a separate software tool to graphically plot the protection curves for more efficient coordination.

An IED is a microprocessor-based electronic device that is capable of sending control signals to switching devices, such as circuit breakers, reclosers, and switches in power systems, both on the distribution network and the transmission network. Many IEDs in use today combine control, monitoring, protection, reclosing elements, communications, power quality monitoring, and metering capabilities. The protection functions supported by IEDs include time delay and instantaneous over-current functions for phase and ground elements, sequence directional over-current functions, reclosing functions, over- and under-frequency protection functions, and over-and under-voltage protection functions. The IEDs also support various metering functions; monitoring of voltage sags, swells, and interruptions; fault location algorithms; and oscillographic record storage. Most IEDs are configured locally using the front panel of the IED device or remotely using a settings software tool, which involves configuring hundreds of setting points individually.

SUMMARY

An exemplary method for configuring an intelligent electronic device in a power delivery system includes receiving identification data for the intelligent electronic device, based on the received identification data and on capabilities of the intelligent electronic device, generating a configuration profile for the intelligent electronic device, receiving operating parameters for the intelligent electronic device, determining a coordination of the intelligent electronic device with the power delivery system based on the received operating parameters, displaying the determined coordination, modifying the configuration profile based on the received operating parameters and the determined coordination, and configuring the intelligent electronic device with the modified configuration profile. A machine readable medium can include software or a computer program or programs for causing a computing device to perform the exemplary method(s).

An exemplary control system for configuring an intelligent electronic device in a power delivery system includes a) a mechanism arranged to receive information identifying the intelligent electronic device and its capabilities, generate a configuration profile for the intelligent electronic device based on the received information, receive operating parameters for the intelligent electronic device and determine a coordination of the intelligent electronic device with the power delivery system based on the received operating parameters, b) a display for displaying the determined coordination, and c) a mechanism arranged to configure the intelligent electronic device with the configuration profile.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements

FIGS. 6-7 show screenshots of exemplary graphical user interfaces for entering system information.

FIG. 8 shows a screenshot of an exemplary graphical user interface that prompts the user for settings information.

FIG. 10 is a screenshot illustrating exemplary coordination information.

FIG. 12 is a screenshot illustrating an exemplary graphical user interface of a search facility or function.

DETAILED DESCRIPTION

Figure 1:
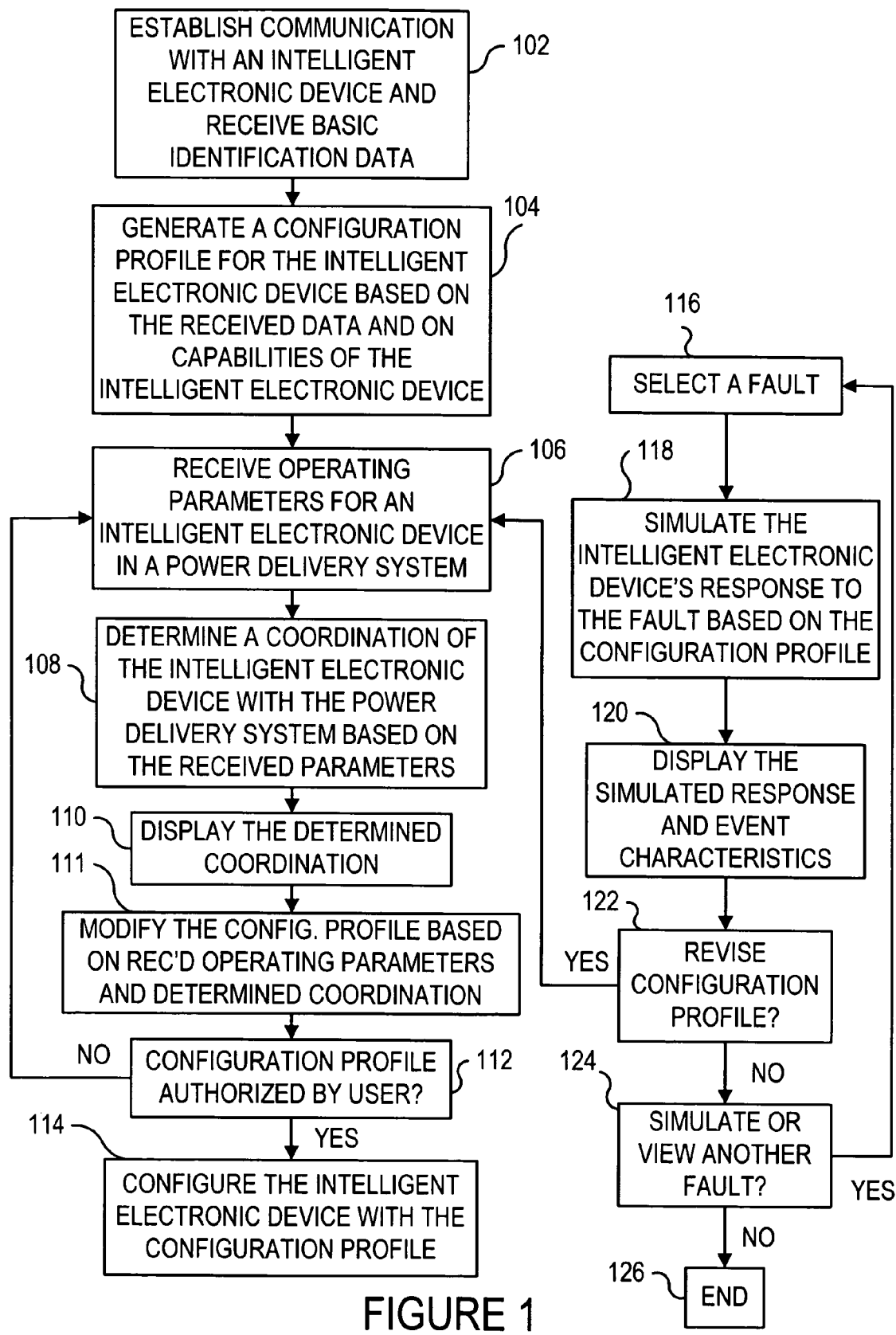
FIG. 1 illustrates an exemplary method.

FIG. 1 illustrates operation of an exemplary intelligent configurator in accordance with an embodiment, wherein in a first step 102, communication is established with an intelligent electronic device, and basic identification data are received, for example from the intelligent electronic device. The basic identification data for the intelligent electronic device can include, for example, communication parameters, catalog number, serial number, data rate, communication protocol, and so forth.

From block 102 control proceeds to block 104, where a configuration profile for the intelligent electronic device is generated based on the received basic identification data and on capabilities of the intelligent electronic device. In an exemplary embodiment, the generated configuration profile can be a default profile.

The capabilities of the intelligent electronic device can be included with the basic identification data, and/or can be provided to the analysis tool, for example, by the user designating a file corresponding to the intelligent electronic device and which the tool can access. Alternatively, the tool can be equipped with a library of information regarding intelligent electronic devices which can be accessed accordingly when the user designates or identifies the intelligent electronic device. As a further alternative, the tool can query the intelligent electronic device directly to identify the device, and can also obtain necessary information about the intelligent electronic device from the device itself and/or can automatically contact a remote resource via a network such as the internet to obtain information about capabilities of the intelligent electronic device and associated specifications. The remote information source can, for example, be a website provided or maintained by a manufacturer or distributor of the intelligent electronic device.

From block 104 control proceeds to block 106 wherein operating parameters are received for an intelligent electronic device in a power delivery system. The intelligent electronic device can be, for example, a recloser. Operating parameters can, for example, be received from a user, who answers questions from a graphical user interface to describe desired behavior and/or performance characteristics of the intelligent electronic device, and can also include information regarding the power delivery system in which the intelligent electronic device will operate.

From block 106, control proceeds to block 108, wherein a coordination of the intelligent electronic device with the power delivery system is determined based on the operating parameters received in block 106. From block 108 control proceeds to block 110, wherein the determined coordination is displayed, for example, to the user. The display can be, for example, a display screen of a computer system performing the functions described in FIG. 1, or any other display mechanism. From block 110 control proceeds to block 111, wherein the configuration profile is modified based on the received operating parameters and the determined coordination. From block 111 control proceeds to block 112, wherein a determination is made whether the configuration profile is authorized by the user, for example by receiving an indication from the user. This can be implemented, for example, by providing the user with a prompt via a graphical user interface (GUI) so that the user can approve or disapprove the configuration profile. If the determination in block 112 is no, then control returns to block 106. If the determination in block 112 is yes, then control proceeds to block 114, wherein the intelligent device is configured in accordance with the configuration profile. From block 114, control proceeds to block 126, where the process ends.

Block 116 starts a process that can run concurrently with the process starting at block 102, and which can divert or merge into the process starting at block 102, as shown with respect to block 122. In particular, at block 116 a fault is selected. The fault can be selected for example, by the user from a menu or listing of faults, and the faults can the theoretical faults or faults which have actually occurred in the past within the power delivery system. Alternatively, the tool can automatically select a fault (and can repeat the process described or shown in FIG. 1 with respect to multiple faults). From block 116, control proceeds to block 118, wherein the intelligent electronic device's response to the fault is simulated based on the configuration profile. From block 118, control proceeds to block 120 wherein the simulated response of the intelligent electronic device's behavior with respect to the fault and event characteristics are displayed, for example to the user. The simulated response can also be stored, for example, to use in later analysis.

From block 120 control proceeds to block 122, wherein a determination is made whether to revise the configuration profile, for example by receiving a user's indication whether or not to revise the configuration profile. If yes, then control proceeds from block 122 to block 106. If no, then control proceeds from block 122 to block 124, where a determination is made whether to simulate or view another fault, for example by receiving a user's indication whether or not to simulate or view another fault. If the determination in block 124 is yes, then control returns to block 116, otherwise control proceeds to block 126 where the process ends.

Figure 2A:
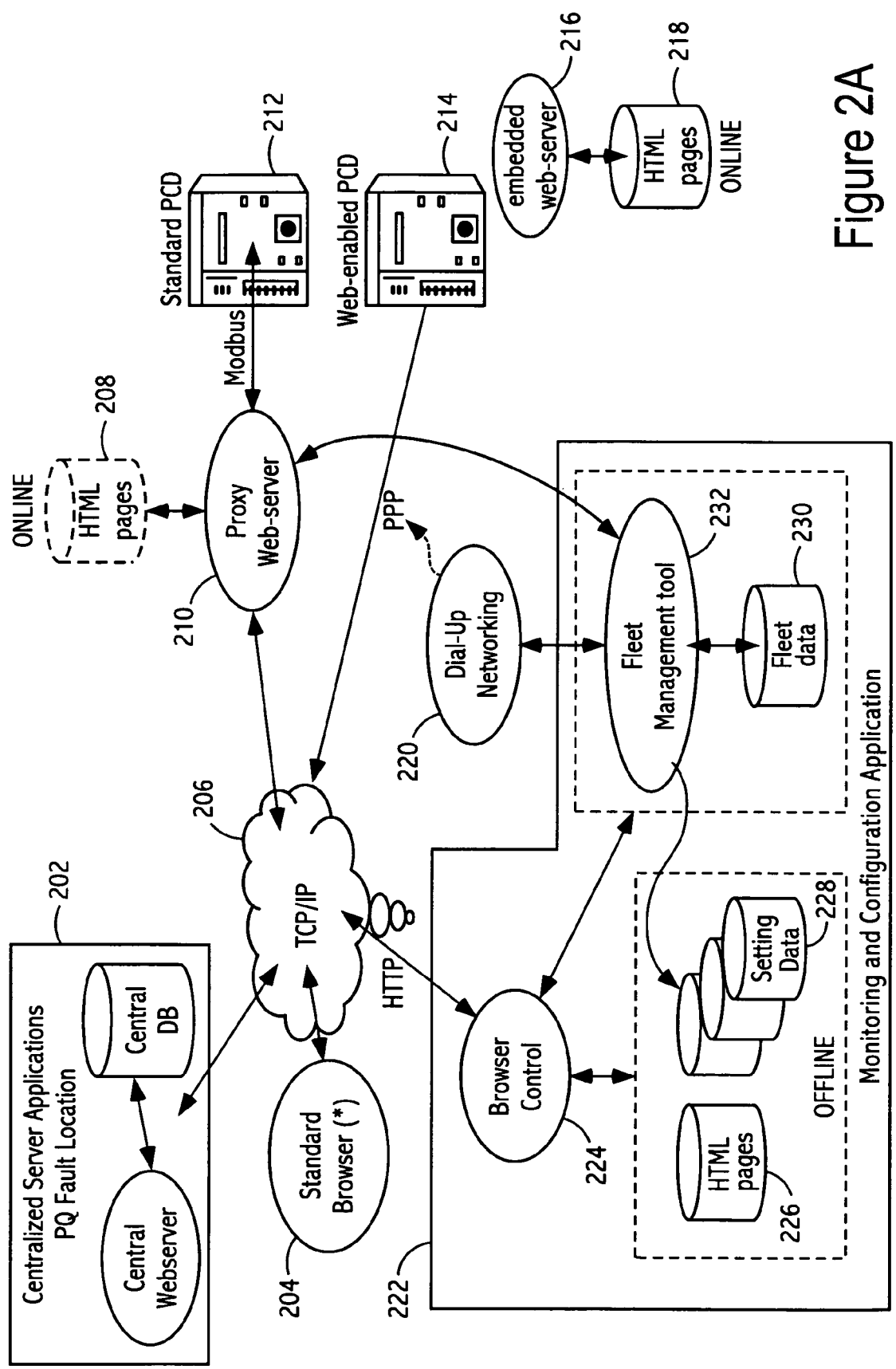
FIG. 2A illustrates an exemplary system including an exemplary embodiment.

FIG. 2A illustrates an exemplary system in which the method of FIG. 1 can be implemented. As shown in FIG. 2A, a fleet management tool 232 capable of performing the functions and operation described in FIG. 1 is connected to a fleet of intelligent electronic devices for example, a standard PCD (Power Control Device) or IED (Intelligent Electronic Device) 212 and a web-enabled PCD or IED 214 via a browser controller 224 connected to the fleet management tool 232 and a network 206 such as the internet which in turn is connected to the IED 214 and also the IED 212 (via a proxy web-server 210). The fleet management tool is also shown connected to a database or data storage 230 containing data regarding the fleet of IEDs as well as a database 228 containing setting data and a database 226 containing HTML pages. The databases 226, 228 can be "offline data", that is remote to the fleet management tool 232 and/or is not accessed in real time. The browser controller 224 can also be connected to the databases 226, 228. The browser 224, fleet management tool 232 and databases 226, 228 and 230 can be grouped within a single tool or device 222. The tool 222 can be, for example, a computer system running software to perform the functions describe herein and including a display screen.

The fleet management tool 232 can also connect to a dial-up networking interface 220 which can, for example, connect directly to one or more of the proxy web-server 210, the standard IED 212, and the web-enabled IED 214. A user can access the tool 222 and/or the fleet management tool 232 via a web browser 204 connected to the tool 222 via the network 206. Additional resources 202 including for example, a central web-server in connection with a central database for storing duplicate and/or additional information (e.g., fault location data) can also be connected to the network 206 and accessed by the tool 222 and/or the fleet management tool 232. The proxy web-server 210 can be connected to an online database 208 to support the standard IED 212. The web-enabled IED 214 can include or be connected to an embedded web-server 216 which in turn can access a database 218, for example an online database.

Programmable inputs and outputs are one of the more powerful features in the PCD recloser controller devices. This feature allows a user to program advanced control applications via the PCD logical and physical I/O, as well as the feedback and user logical inputs and outputs available within the device itself. Programmable logic in the PCD enables users to tailor their control to their particular needs.

Exemplary PCDs include 16 physical outputs and inputs, some externally and some internally available. PCDs can include any number of physical outputs and inputs. The settings software tool shown in FIG. 2B, in particular the I/O control module 2220, allows the user to assign logical inputs to physical inputs and logical outputs to physical outputs. The software also enables the user to support more complicated control functionality using the feedback and user logical I/O. Feedback contacts pass logical outputs to logical inputs by providing a "feedback loop" from the outputs to the inputs. The number of feedback contacts available can depend on the number of contacts taken up by the external contacts (i.e., type of I/O cards used). User logical inputs pass input contact status to physical outputs via user logical outputs. This feature allows the user to tie logical inputs to logical outputs, and thus, physical inputs to physical outputs.

It should be noted that Peer-to-peer (P2P) logic and communications have been the focus of distribution automation engineers for loop networks for the past several years. P2P involves communication between IEDs out on the feeder, as well as distributed logic implemented at each IED location, to isolate distribution faults. P2P enables a utility to isolate distribution faults more quickly and reduce reclosing into the fault (which occurs when a basic loop control scheme is implemented), which can damage parts of the distribution system. Although many utilities have implemented a loop control scheme in recent years, the majority of utilities have not implemented loop control with P2P, due to its complexity and communication requirements. P2P does not only entail communication between IEDs out on the feeder, but it also means implementing control logic to achieve fault isolation immediately after a fault has occurred. The combination of logic and communications leads to an intelligent control system in which pertinent information is passed from one IED to other IEDs in the distribution network, and control decisions are made locally (at each recloser) based on this information. In an exemplary embodiment, the tool 2210 and/or one or more of the modules in the set 2216 (e.g. the configuration module 2218 and/or the I/O control module 2220) can configure multiple intelligent electronic devices in a power distribution network or system to communicate with each other and isolate distribution faults.

Consistent with exemplary embodiments and methods described herein, a loop control scheme enables IEDs, such as the PCD, to perform automatic loop restoration functions, commonly accepted as a means or mechanism to significantly improve circuit reliability and to provide more effective system operation. For example, in an exemplary embodiment, the tool 2210 and/or one or more of the modules in the set 2216 (e.g. the configuration module 2218 and/or the I/O control module 2220) can configure multiple intelligent electronic devices in a power distribution network or system to monitor reclosers installed in series between substation feeder circuits of the power delivery system and in the event of a fault in power delivery system operate the reclosers to isolate the fault. Thus, such a loop control scheme can provide switching operations of the recloser to sectionalize or remove the faulted section from the distribution system. For example, a recloser IED can be capable of monitoring up to two banks of three-phase voltages (6 potential transformers total) and to consider them in controlling breaker operations. An exemplary recloser loop control scheme can utilize a predetermined number of IED-controlled reclosers installed in series between two substation feeder circuits. This provides isolation of any faulted section within a given distribution circuit while simultaneously re-establishing service to all customers unaffected by the faulted section within a relatively short period. Exemplary loop control schemes can be located at or near key customers at various locations throughout the distribution system, or where reliability on particular circuits is particularly poor.

Figure 2B:
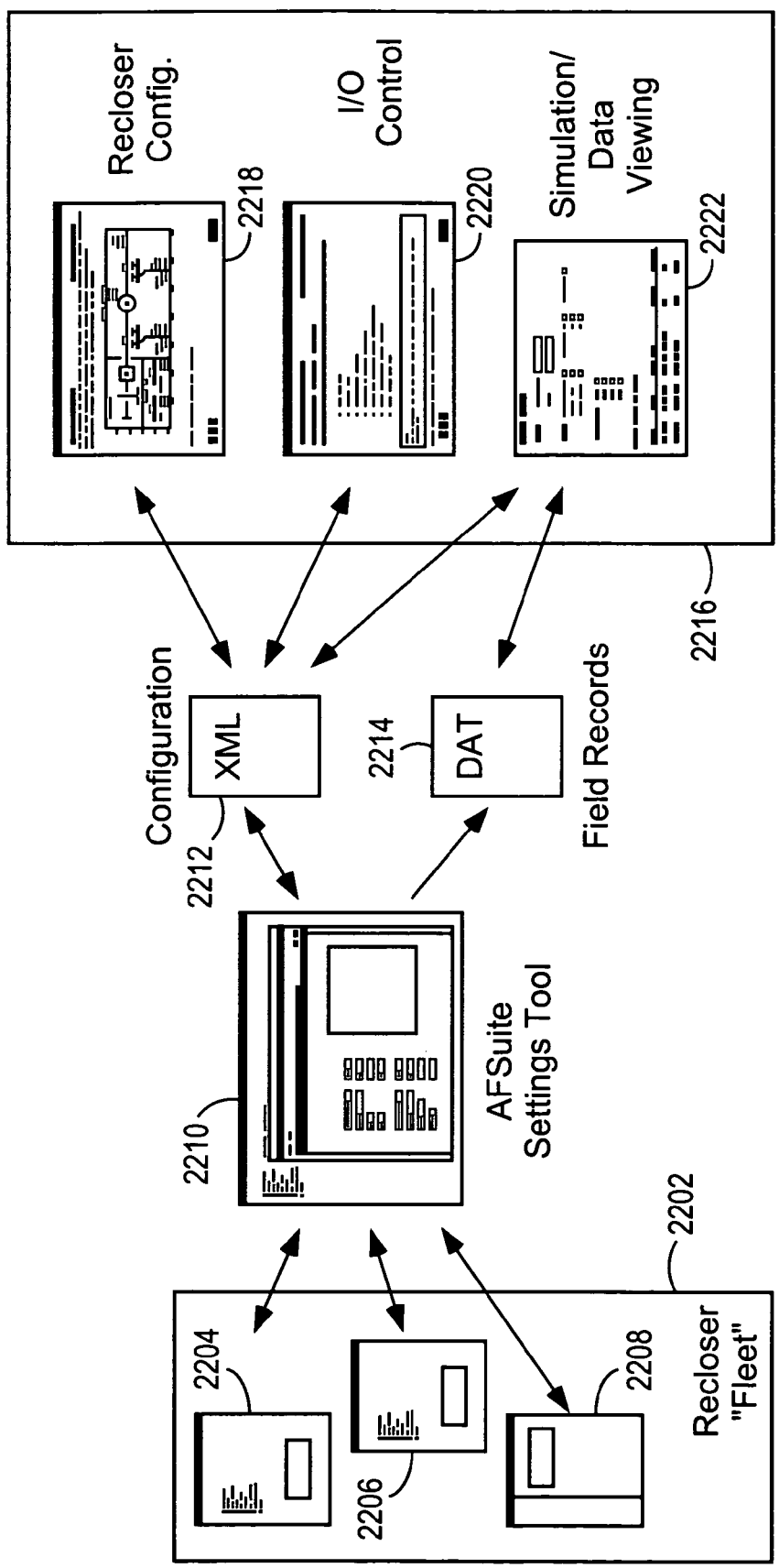
FIG. 2B illustrates an exemplary embodiment.

FIG. 2B illustrates an exemplary structure for implementing the processes shown for example in FIGS. 1 and 34, and which can be provided as an implementation of the fleet management tool 232 shown in FIG. 2A. As shown in FIG. 2B, a fleet 2202 of IEDs 2204, 2206 and 2208 (which can be for example power control devices such as programmable reclosers, programmable switches, etc.) is connected to, configured and controlled by a settings tool 2210, which can be for example an ASEA Brown Boveri's (ABB's) AF (Automated Feeder) suite settings tool, which in turn receives configuration data 2212 from a set 2216 of software modules. For example, the setting tool 2210 can create configuration files, and one or more of the software modules can modify the configuration files. The settings tool 2210 also provides field records 2214, for example, historical records concerning the configuration and operation of the fleet 2202, to the set 2216 of modules. The historical records can include, for example, historical operations data with time stamps, and can be in ASCII (American Standard Code for Information Exchange) format. The configuration data 2212 can be provided, for example, in an XML format, in a format proprietary to the ABB AF suite, in the substation configuration language (SCL) which is an XML (extensible Markup Language) aspect of the substation relay configuration standard IEC-61850 (and which is hereby incorporated by reference), or in any other data format. The set 2216 includes a recloser configuration module 2218, and I/O (input/output) control module 2220, and a simulation/data viewing module 2222. The simulation/data viewing module can be used to simulate performance and view performance (real or simulated), view event characteristics, and so forth.

The Field Records 2214 shown in FIG. 2B can include operation records, which can be used for simulation, for example:

| | |
|---|---|
| PCD name: | Protection_Simulator |
| PCD serial n.: | 16997754 |
| PCD cat num.: | 8R371041513011 |
| PCD FW ver.: | V 2.91 |
| Title: | Operation Records Report |
| | Reports the most recent 60 operation records |
| File: | C:\Program Files\ABB, Inc\AFSuite\PCDS Reports\Protection_Simulator\ oprecords_16 Aug 2004_143338.txt |
| Date: | 16 Aug 2004 |
| Time: | 14:33:38 |
| PCD Date: | 16 Aug 2004 |
| PCD Time: | 14:33:12 |

| Record | Operation | Date | Time | Message | Value |
|---|---|---|---|---|---|
| 1 | 121 | 16-Aug-2004 | 14:32:29.410 | 52a-Opened | 0 |
| 2 | 120 | 16-Aug-2004 | 14:32:29.410 | Recloser-Lockout | 0 |
| 3 | 119 | 16-Aug-2004 | 14:32:29.410 | Breaker-Opened | 0 |
| 4 | 118 | 16-Aug-2004 | 14:32:29.410 | 52b-Closed | 0 |
| 5 | 117 | 16-Aug-2004 | 14:32:29.360 | 51P-Trip | 1 |
| 6 | 116 | 16-Aug-2004 | 14:32:27.220 | 52b-Opened | 0 |
| 7 | 115 | 16-Aug-2004 | 14:32:27.220 | 52a-Closed | 0 |
| 8 | 114 | 16-Aug-2004 | 14:32:27.220 | Breaker-Closed | 0 |
| 9 | 113 | 16-Aug-2004 | 14:32:27.180 | Reclose-Intiated | 0 |
| 10 | 112 | 16-Aug-2004 | 14:32:22.180 | 52a-Opened | 0 |
| 11 | 111 | 16-Aug-2004 | 14:32:22.180 | Breaker-Opened | 0 |
| 12 | 110 | 16-Aug-2004 | 14:32:22.180 | 52b-Closed | 0 |
| 13 | 109 | 16-Aug-2004 | 14:32:22.130 | 51P-Trip | 1 |
| 14 | 108 | 16-Aug-2004 | 14:32:19.980 | 52b-Opened | 0 |
| 15 | 107 | 16-Aug-2004 | 14:32:19.980 | 52a-Closed | 0 |
| 16 | 106 | 16-Aug-2004 | 14:32:19.980 | Breaker-Closed | 0 |
| 17 | 105 | 16-Aug-2004 | 14:32:19.940 | Reclose-Intiated | 0 |
| 18 | 104 | 16-Aug-2004 | 14:32:14.940 | 52a-Opened | 0 |
| 19 | 103 | 16-Aug-2004 | 14:32:14.940 | Breaker-Opened | 0 |
| 20 | 102 | 16-Aug-2004 | 14:32:14.940 | 52b-Closed | 0 |
| 21 | 101 | 16-Aug-2004 | 14:32:14.890 | 50P-1-Trip | 1 |
| 22 | 100 | 16-Aug-2004 | 14:32:14.880 | 52b-Opened | 0 |
| 23 | 99 | 16-Aug-2004 | 14:32:14.880 | 52a-Closed | 0 |
| 24 | 98 | 16-Aug-2004 | 14:32:14.880 | Breaker-Closed | 0 |
| 25 | 97 | 16-Aug-2004 | 14:32:14.850 | Reclose-Intiated | 0 |
| 26 | 96 | 16-Aug-2004 | 14:32:12.850 | 52a-Opened | 0 |
| 27 | 95 | 16-Aug-2004 | 14:32:12.850 | Breaker-Opened | 0 |
| 28 | 94 | 16-Aug-2004 | 14:32:12.840 | 52b-Closed | 0 |
| 29 | 93 | 16-Aug-2004 | 14:32:12.790 | 50P-1-Trip | 1 |
| 30 | 92 | 16-Aug-2004 | 14:31:42.030 | 52b-Opened | 0 |
| 31 | 91 | 16-Aug-2004 | 14:31:42.030 | 52a-Closed | 0 |
| 32 | 90 | 16-Aug-2004 | 14:31:42.030 | Breaker-Closed | 0 |
| 33 | 89 | 16-Aug-2004 | 14:31:42.000 | Manual-Close | 0 |
| 34 | 88 | 16-Aug-2004 | 14:31:39.860 | 52a-Opened | 0 |
| 35 | 87 | 16-Aug-2004 | 14:31:39.860 | Recloser-Lockout | 0 |
| 36 | 86 | 16-Aug-2004 | 14:31:39.860 | Breaker-Opened | 0 |
| 37 | 85 | 16-Aug-2004 | 14:31:39.860 | 52b-Closed | 0 |
| 38 | 84 | 16-Aug-2004 | 14:31:39.810 | 50P-1-Trip | 1 |
| 39 | 83 | 16-Aug-2004 | 14:31:39.800 | 52b-Opened | 0 |
| 40 | 82 | 16-Aug-2004 | 14:31:39.800 | 52a-Closed | 0 |
| 41 | 81 | 16-Aug-2004 | 14:31:39.800 | Breaker-Closed | 0 |
| 42 | 80 | 16-Aug-2004 | 14:31:39.770 | Manual-Close | 0 |
| 43 | 79 | 16-Aug-2004 | 14:24:29.870 | 52a-Opened | 0 |
| 44 | 78 | 16-Aug-2004 | 14:24:29.870 | Recloser-Lockout | 0 |
| 45 | 77 | 16-Aug-2004 | 14:24:29.870 | Breaker-Opened | 0 |
| 46 | 76 | 16-Aug-2004 | 14:24:29.860 | 52b-Closed | 0 |
| 47 | 75 | 16-Aug-2004 | 14:24:29.810 | 51P-Trip | 1 |
| 48 | 74 | 16-Aug-2004 | 14:24:27.680 | 52b-Opened | 0 |
| 49 | 73 | 16-Aug-2004 | 14:24:27.680 | 52a-Closed | 0 |
| 50 | 72 | 16-Aug-2004 | 14:24:27.680 | Breaker-Closed | 0 |
| 51 | 71 | 16-Aug-2004 | 14:24:27.640 | Reclose-Intiated | 0 |
| 52 | 70 | 16-Aug-2004 | 14:24:25.640 | 52a-Opened | 0 |
| 53 | 69 | 16-Aug-2004 | 14:24:25.640 | Breaker-Opened | 0 |
| 54 | 68 | 16-Aug-2004 | 14:24:25.630 | 52b-Closed | 0 |
| 55 | 67 | 16-Aug-2004 | 14:24:25.580 | 50P-1-Trip | 1 |
| 56 | 66 | 16-Aug-2004 | 14:24:14.170 | 52b-Opened | 0 |
| 57 | 65 | 16-Aug-2004 | 14:24:14.170 | 52a-Closed | 0 |
| 58 | 64 | 16-Aug-2004 | 14:24:14.170 | Breaker-Closed | 0 |
| 59 | 63 | 16-Aug-2004 | 14:24:14.130 | Manual-Close | 0 |
| 60 | 62 | 16-Aug-2004 | 14:24:06.400 | 52a-Opened | 0 |

The Field Records 2214 shown in FIG. 2B can include fault records, which can be used for simulation, for example:

| | |
|---|---|
| PCD name: | Protection_Simulator |
| PCD serial n.: | 16997754 |
| PCD cat num.: | 8R371041513011 |
| PCD FW ver.: | V 2.91 |
| Title: | Fault Records Report |
| | Reports the most recent 10 fault detailed records |
| File: | C:\Program Files\ABB, Inc\AFSuite\PCDS Reports\Protection_Simulator\ faultrecords_16 Aug 2004_143401.txt |
| Date: | 16 Aug 2004 |
| Time: | 14:34:01 |
| PCD Date: | 16 Aug 2004 |
| PCD Time: | 14:33:36 |

| No. | Rec. | Recl Seq | Elem. | Date | Time |
|---|---|---|---|---|---|
| 1 | 13 | Primary-Lockout | 51P | 16-Aug-2004 | 14:32:29.420 |

Distance (miles) 0.0
Impedence (Ohms) 0.000
Relay Time (milliseconds) 2183
Clear Time (milliseconds) 50

|  | Amplitude | Angle |
|---|---|---|
| IA (A) | 459 | 0 |
| IB (A) | 0 | 245 |
| IC (A) | 0 | 199 |
| IN (A) | 0 | 63 |
| I1 (A) | 153 | 0 |
| I2 (A) | 153 | 0 |
| I0 (A) | 152 | 0 |
| Van (kV) | 11.64 | 0 |
| Vbn (kV) | 11.64 | 0 |
| Vcn (kV) | 11.64 | 0 |
| V1 (kV) | 0.02 | 270 |
| V2 (kV) | 0.02 | 270 |
| V0 (kV) | 0 | 0 |
| 2  12  Primary-3  51P  16-Aug-2004  14:32:22.180 | | |

Distance (miles) 0.0

Impedence (Ohms) 0.000

Relay Time (ms) 2187

Clear Time (ms) 50

|  | Amplitude | Angle |
|---|---|---|
| IA (A) | 457 | 0 |
| IB (A) | 1 | 211 |
| IC (A) | 1 | 210 |
| IN (A) | 0 | 236 |
| I1 (A) | 153 | 0 |
| I2 (A) | 153 | 0 |
| I0 (A) | 151 | 360 |
| Van (kV) | 11.62 | 0 |
| Vbn (kV) | 11.63 | 0 |
| Vcn (kV) | 11.63 | 0 |
| V1 (kV) | 0.02 | 267 |
| V2 (kV) | 0.02 | 267 |
| V0 (kV) | 0 | 0 |
| 3  11  Primary-2  50P-1  16-Aug-2004  14:32:14.950 | | |

Distance (miles) 0.0

Impedence (Ohms) 0.000

Relay Time (ms) 41

Clear Time (ms) 54

|  | Amplitude | Angle |
|---|---|---|
| IA (A) | 457 | 0 |
| IB (A) | 0 | 149 |
| IC (A) | 0 | 148 |
| IN (A) | 0 | 237 |
| I1 (A) | 152 | 0 |
| I2 (A) | 152 | 0 |
| I0 (A) | 152 | 0 |
| Van (kV) | 11.62 | 0 |
| Vbn (kV) | 11.63 | 0 |
| Vcn (kV) | 11.63 | 0 |
| V1 (kV) | 0.02 | 277 |
| V2 (kV) | 0.02 | 278 |
| V0 (kV) | 0 | 0 |
| 4  10  Primary-1  50P-1  16-Aug-2004  14:32:12.850 | | |

Distance (miles) 0.0

Impedence (Ohms) 0.000

Relay Time (ms) 41

Clear Time (ms) 54

|  | Amplitude | Angle |
|---|---|---|
| IA (A) | 457 | 0 |
| IB (A) | 0 | 151 |
| IC (A) | 0 | 150 |
| IN (A) | 0 | 149 |
| I1 (A) | 153 | 0 |
| I2 (A) | 153 | 0 |
| I0 (A) | 152 | 0 |
| Van (kV) | 11.63 | 0 |
| Vbn (kV) | 11.64 | 0 |
| Vcn (kV) | 11.64 | 0 |
| V1 (kV) | 0.01 | 274 |
| V2 (kV) | 0.02 | 276 |
| V0 (kV) | 0 | 0 |
| 5  9  Primary-Lockout  50P-1  16-Aug-2004  14:31:39.870 | | |

Distance (miles) 0.0

Impedence (Ohms) 0.000

Relay Time (ms) 41

Clear Time (ms) 54

|  | Amplitude | Angle |
|---|---|---|
| IA (A) | 458 | 0 |
| IB (A) | 0 | 172 |
| IC (A) | 0 | 171 |
| IN (A) | 0 | 80 |
| I1 (A) | 153 | 0 |
| I2 (A) | 153 | 0 |
| I0 (A) | 152 | 0 |
| Van (kV) | 11.64 | 0 |
| Vbn (kV) | 11.64 | 0 |
| Vcn (kV) | 11.64 | 0 |
| V1 (kV) | 0.01 | 263 |
| V2 (kV) | 0.01 | 276 |
| V0 (kV) | 0 | 0 |
| 6  8  Primary-Lockout  51P  16-Aug-2004  14:24:29.870 | | |

Distance (miles) 0.0

Impedence (Ohms) 0.000

Relay Time (ms) 2175

Clear Time (ms) 54

|  | Amplitude | Angle |
|---|---|---|
| IA (A) | 458 | 0 |
| IB (A) | 0 | 152 |
| IC (A) | 0 | 106 |
| IN (A) | 0 | 60 |
| I1 (A) | 153 | 0 |
| I2 (A) | 153 | 0 |
| I0 (A) | 153 | 0 |
| Van (kV) | 11.64 | 0 |
| Vbn (kV) | 11.65 | 0 |
| Vcn (kV) | 11.65 | 0 |
| V1 (kV) | 0.01 | 274 |
| V2 (kV) | 0.01 | 274 |
| V0 (kV) | 0 | 0 |
| 7  7  Primary-1  50P-1  16-Aug-2004  14:24:25.640 | | |

Distance (miles) 0.0

Impedence (Ohms) 0.000

Relay Time (ms) 41

Clear Time (ms) 54

|  | Amplitude | Angle |
|---|---|---|
| IA (A) | 458 | 0 |
| IB (A) | 0 | 233 |
| IC (A) | 0 | 186 |
| IN (A) | 0 | 231 |
| I1 (A) | 153 | 0 |
| I2 (A) | 153 | 0 |
| I0 (A) | 152 | 360 |
| Van (kV) | 11.63 | 0 |
| Vbn (kV) | 11.64 | 0 |
| Vcn (kV) | 11.63 | 0 |
| V1 (kV) | 0.02 | 273 |
| V2 (kV) | 0.02 | 270 |
| V0 (kV) | 0 | 0 |
| 8   6   Primary-Lockout   50P-1   16-Aug-2004   14:24:06.400 | | |

Distance (miles) 0.0

Impedence (Ohms) 0.000

Relay Time (ms) 41

Clear Time (ms) 54

|  | Amplitude | Angle |
|---|---|---|
| IA (A) | 456 | 0 |
| IB (A) | 1 | 179 |
| IC (A) | 1 | 178 |
| IN (A) | 0 | 185 |
| I1 (A) | 152 | 0 |
| I2 (A) | 152 | 0 |
| I0 (A) | 150 | 0 |
| Van (kV) | 11.60 | 0 |
| Vbn (kV) | 11.61 | 0 |
| Vcn (kV) | 11.61 | 0 |
| V1 (kV) | 0.02 | 252 |
| V2 (kV) | 0.02 | 252 |
| V0 (kV) | 0 | 0 |
| 9   5   Primary-Lockout   51P   16-Aug-2004   13:57:49.030 | | |

Distance (miles) 999.9

Impedence (Ohms) 0.000

Relay Time (ms) 4791

Clear Time (ms) 54

|  | Amplitude | Angle |
|---|---|---|
| IA (A) | 311 | 0 |
| IB (A) | 1 | 202 |
| IC (A) | 1 | 201 |
| IN (A) | 0 | 20 |
| I1 (A) | 103 | 0 |
| I2 (A) | 103 | 0 |
| I0 (A) | 102 | 0 |
| Van (kV) | 11.65 | 0 |
| Vbn (kV) | 11.66 | 0 |
| Vcn (kV) | 11.65 | 0 |
| V1 (kV) | 0.02 | 264 |
| V2 (kV) | 0.02 | 260 |
| V0 (kV) | 0 | 0 |
| 10   4   Primary-1   50P-1   16-Aug-2004   13:57:42.180 | | |

Distance (miles) 999.9

Impedence (Ohms) 0.000

Relay Time (ms) 41

Clear Time (ms) 54

|  | Amplitude | Angle |
|---|---|---|
| IA (A) | 310 | 0 |
| IB (A) | 0 | 235 |
| IC (A) | 1 | 234 |
| IN (A) | 0 | 260 |
| I1 (A) | 103 | 0 |
| I2 (A) | 104 | 0 |
| I0 (A) | 103 | 360 |
| Van (kV) | 11.64 | 0 |
| Vbn (kV) | 11.65 | 0 |
| Vcn (kV) | 11.65 | 0 |
| V1 (kV) | 0.02 | 267 |
| V2 (kV) | 0.02 | 265 |
| V0 (kV) | 0 | 0 |

Figure 3:
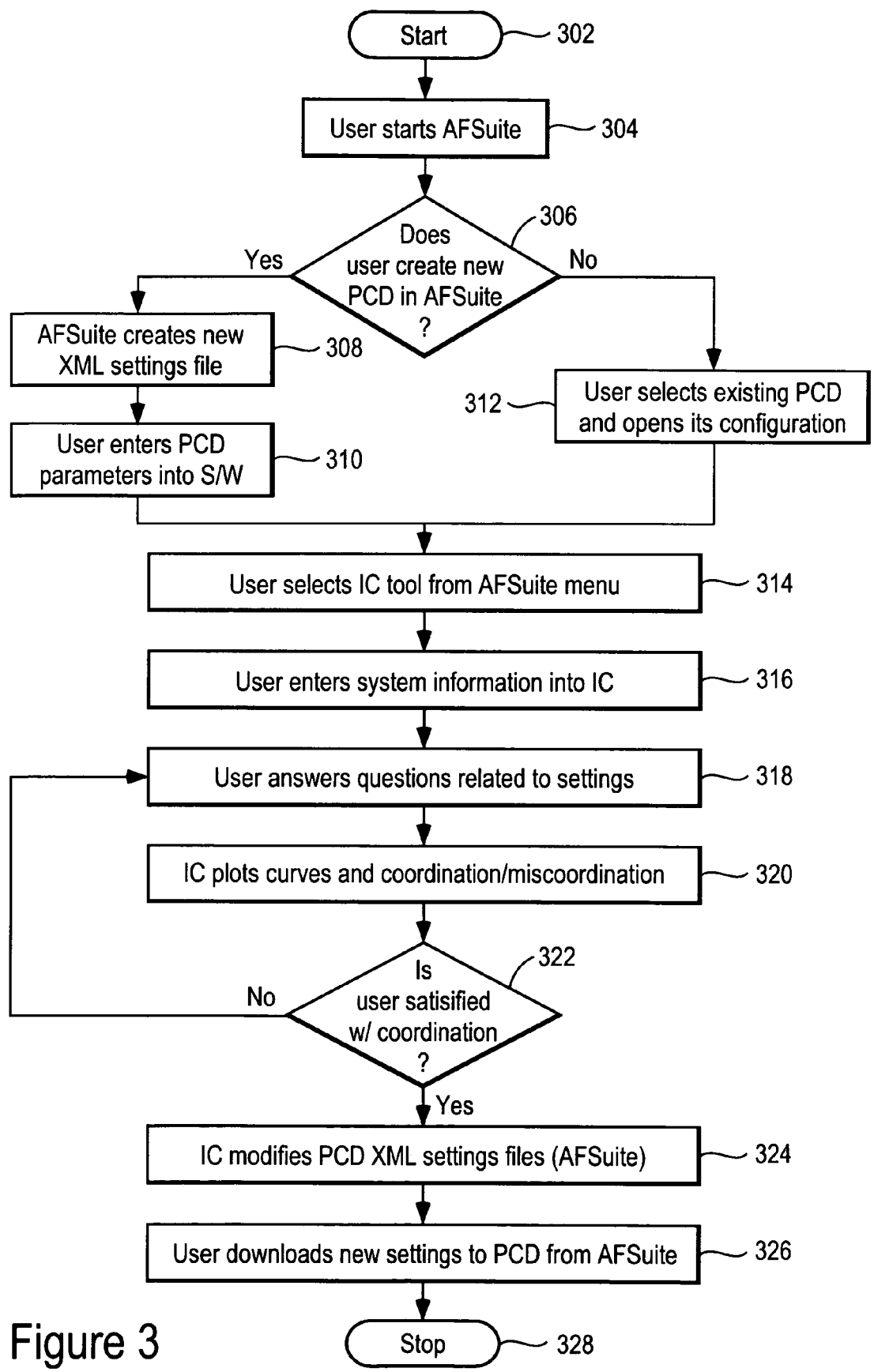
FIG. 3 illustrates operation of a protection coordination module in accordance with an exemplary embodiment.

The recloser configuration module 2218, can also be referred to as a protection coordination module and which can be used to configure and program intelligent electronic devices including programmable reclosers, programmable switches and other devices. The recloser configuration module 2218 can function in accordance with the process shown in FIG. 3. In a first block 302 the process starts and proceeds to block 304 where a user starts or activates the settings tool 2210. From block 304 control proceeds to block 306, where a determination is made whether the user desires to create or configure a new IED or PCD. For example, a determination is made whether an indication has been received by the user, and if so whether the user desires to create or configure a new IED. If no, then control proceeds to block 312 where the user selects an existing PCD or IED and opens or accesses its configuration data. From block 312, control proceeds to block 314. If the determination in block 306 is positive, the control proceeds from block 306 to block 308 where the suite settings tool 2210 creates one or more new settings files for the new device. The settings can for example be expressed in an XML compliant format. From block 308 control proceeds to block 310, wherein parameters regarding the new IED or PCD are received from the user.

These parameters for the IED or PCD can include for example communication parameters, catalog number, serial number, data rate, protocol, basic identification data, and so forth. These parameters can for example be expressed as, or include, desired functional or performance characteristics that the user desires the IED or PCD to provide or operate in accordance with. The user can provide this information by entering it via a graphical user interface (GUI), for example a GUI administered through the suite settings tool 2210. The graphical user interface can include information for the user to select from, and provides prompts or suggestions to the user so that the user can easily enter the parametric information. Thus the user can be guided when desired or necessary by a dialog provided by the configuration module 2218. In an exemplary embodiment, the suite settings tool 2210 can call or activate the configuration module 2218 which can then provide and support the GUI.

Figure 6:
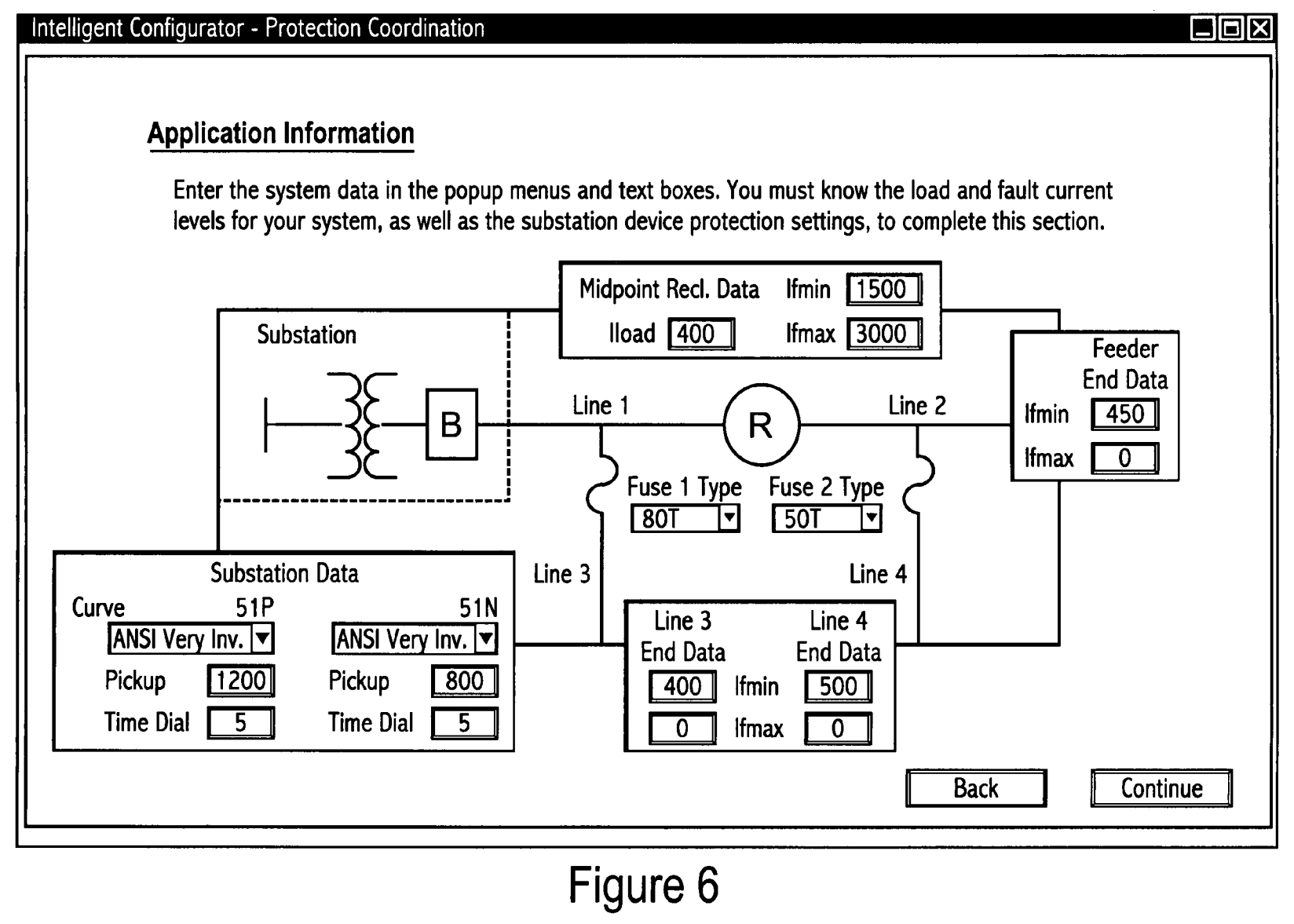

From block 310 control proceeds to 314 where the system can receive a user selection of the configuration module 2218 from a menu provided to the user by the suite settings tool 2210 via graphical user interface. From block 314, control proceeds to block 316 wherein the configuration module 2218 receives system information from the user, for example, information about the power delivery system or situation in which the IED or PCD will be employed or placed. The system information can be provided by the user through a graphical user interface supplied by the configuration module 2218, and in an exemplary embodiment the configuration module 2218 can prompt the user with a dialogue and/or menu selections, which can organize and simplify data entry/selection for the user. FIGS. 6-7 show screenshots of exemplary graphical user interfaces for entering system information.

From block 316 control proceeds to block 318 wherein the system provides questions or prompts to the user regarding settings and/or desired behavior of the IED or PCD and/or of the power delivery system in which the device is or will be located. FIG. 8 shows a screenshot of an exemplary graphical user interface that prompts the user for settings information.

In an exemplary method or embodiment, the functions in blocks 310-318 can be combined or interchanged, so that the system receives information from the user and prompts or requests the user for more information during or after receiving information form the user, in an interactive, iterative cycle. The user can be prompted for information until all necessary or desirable information (or all information that the user is able to provide) has been provided.

Figure 9:
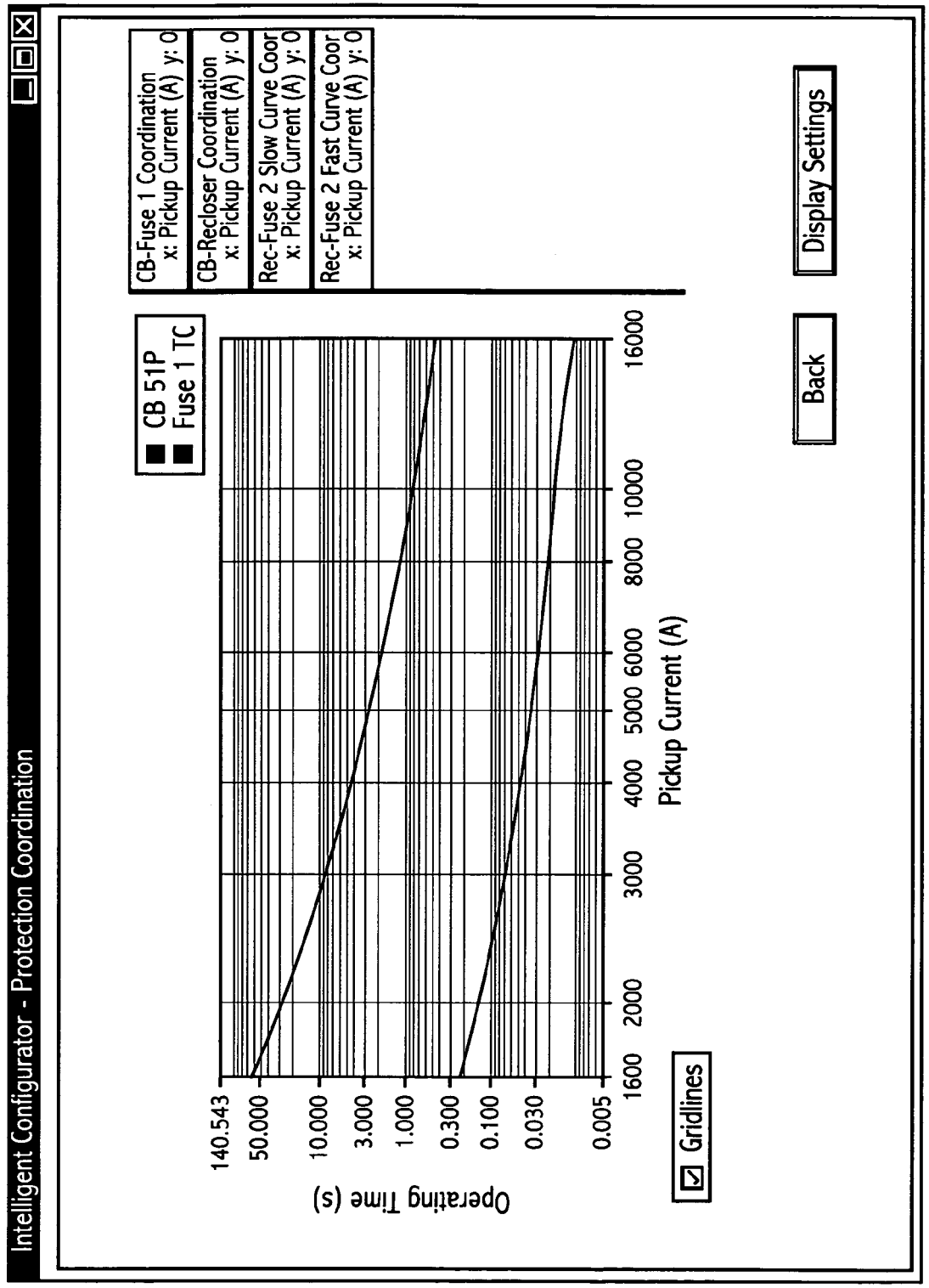
FIG. 9 is a screenshot illustrating an exemplary plot including curves and coordination information.

From block 318 control proceeds to block 320 where the configuration module 2218 plots curves, for example, performance curves of the IED or PCD, and determines coordination (or lack thereof of the IED or PCD with the power delivery system and its relevant components, and displays information including the curves and determined coordination. FIG. 9 is a screenshot illustrating an exemplary plot including curves and coordination information, and FIG. 10 is a screenshot illustrating exemplary coordination information. From block 320, control proceeds to block 322, wherein the system receives an indication from the user whether this information is satisfactory to the user. If the user indicates the information is unsatisfactory, then control returns from block 322 to block 318. If the user is satisfied with the results of block 320, then control proceeds from block 322 to block 324 wherein the configuration module 2218 modifies the settings or configuration files for the IED or PCD (e.g., the configuration data 2212). From block 324, control proceeds to block 326 wherein the suite settings tool 2210 downloads the new configuration settings to the IED or PCD. This can be performed in response to a selection or command by the user or can be performed automatically after the user indicates satisfaction as in block 322. From block 326, control proceeds to block 328 where the process ends. It will be appreciated that the process shown in FIG. 3 or parts thereof can be iteratively repeated.

Figure 4:
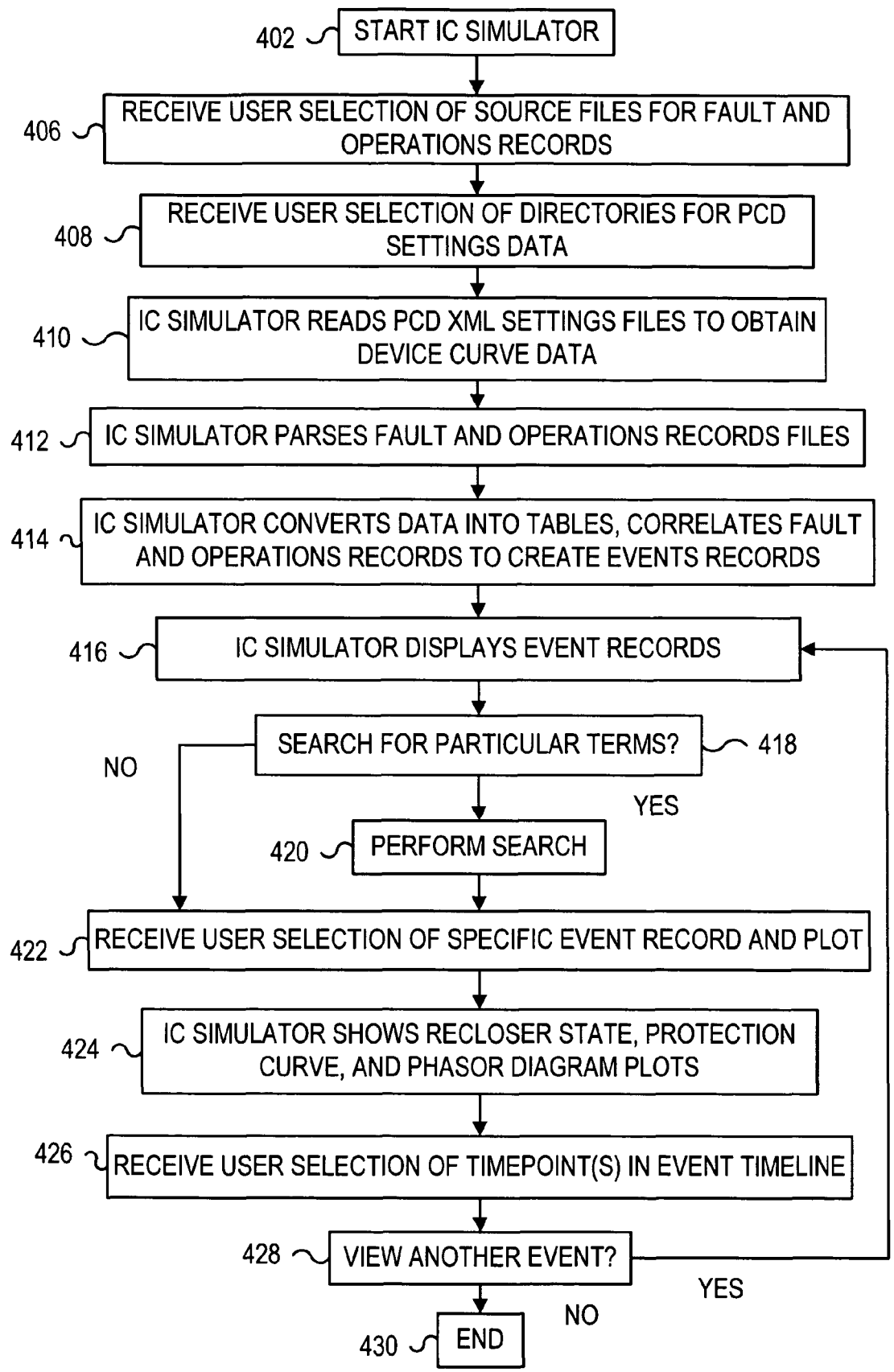
FIG. 4 illustrates operation of a protection simulation module in accordance with an exemplary embodiment.
Figure 11:
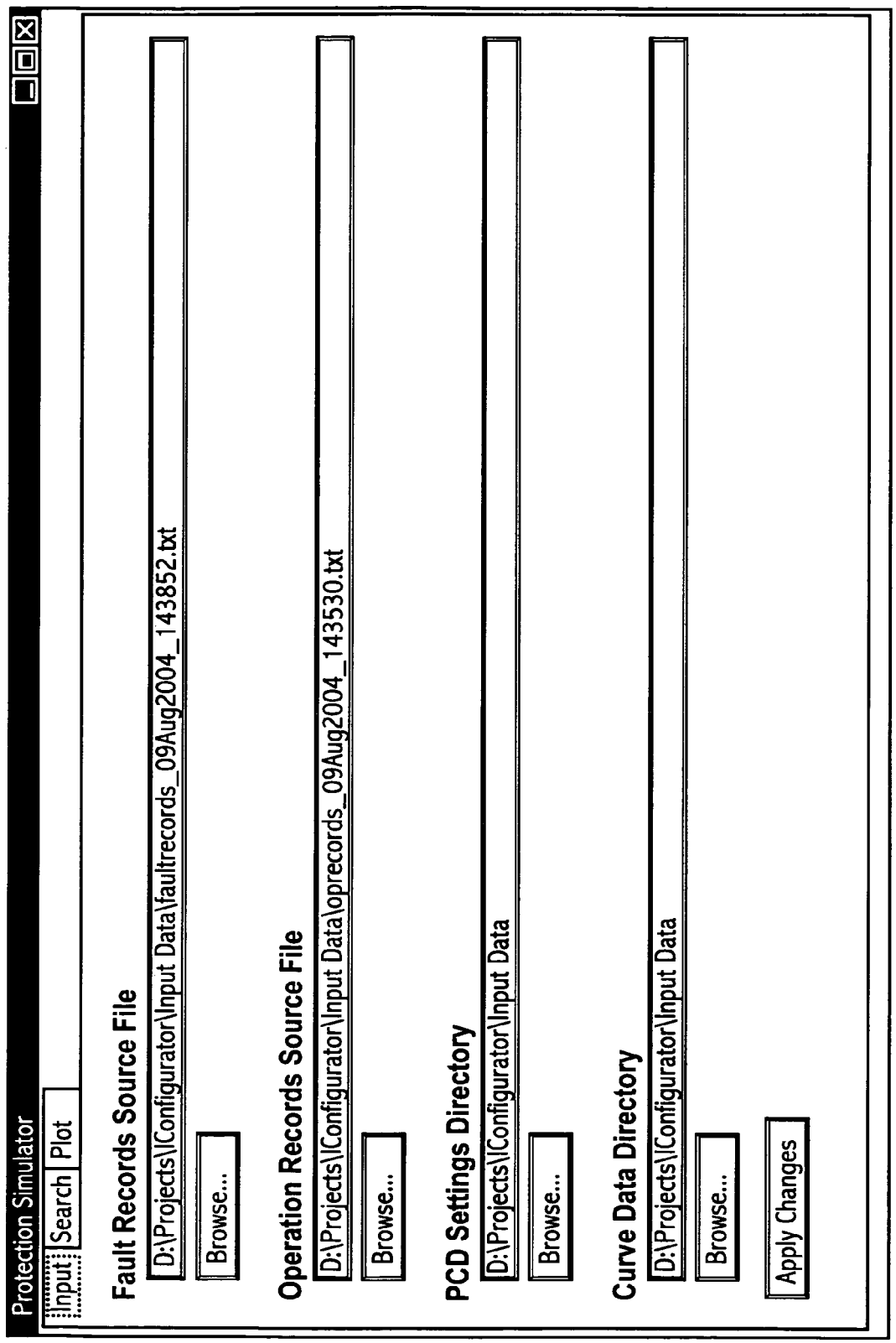
FIG. 11 is a screenshot of an exemplary graphical user interface that receives user selections regarding source files.

FIG. 4 illustrates an exemplary method or process that can be performed for example by the simulation/viewing module 2222. The process starts at block 402 with activation of the simulation/viewing module 2222, for example in response to a user's selection or command received by the suite settings tool 2210. From block 402 control proceeds to block 406 wherein user selections regarding source files to be used for fault and operations records are received. FIG. 11 is a screenshot of an exemplary graphical user interface that receives user selections regarding source files. From block 406 control proceeds to block 408 wherein user selections of directories for PCD or IED settings data are received. From block 408 control proceeds to block 410 wherein the simulation/viewing module 2222 reads PCD or IED settings or configuration files (indicated or identified for example by the user's selections in block 408) to obtain curve data for the PCD or IED. From block 410 control proceeds to block 412 wherein the simulation/viewing module parses the selected fault and operations records files. From block 412 control proceeds to block 414 wherein the simulation/viewing module converts data into tables and correlates faults and operations records to create event records, for example with respect to events that would occur within the power delivery system and/or the PCD or IED. An "event" can be for example a system disturbance that causes a recloser and recloser IED to operate. From block 414 control proceeds to block 416 wherein the simulation/viewing module displays event records from the PCD or IED, for example with respect to events involving or affecting the PCT or IED.

Figure 13:
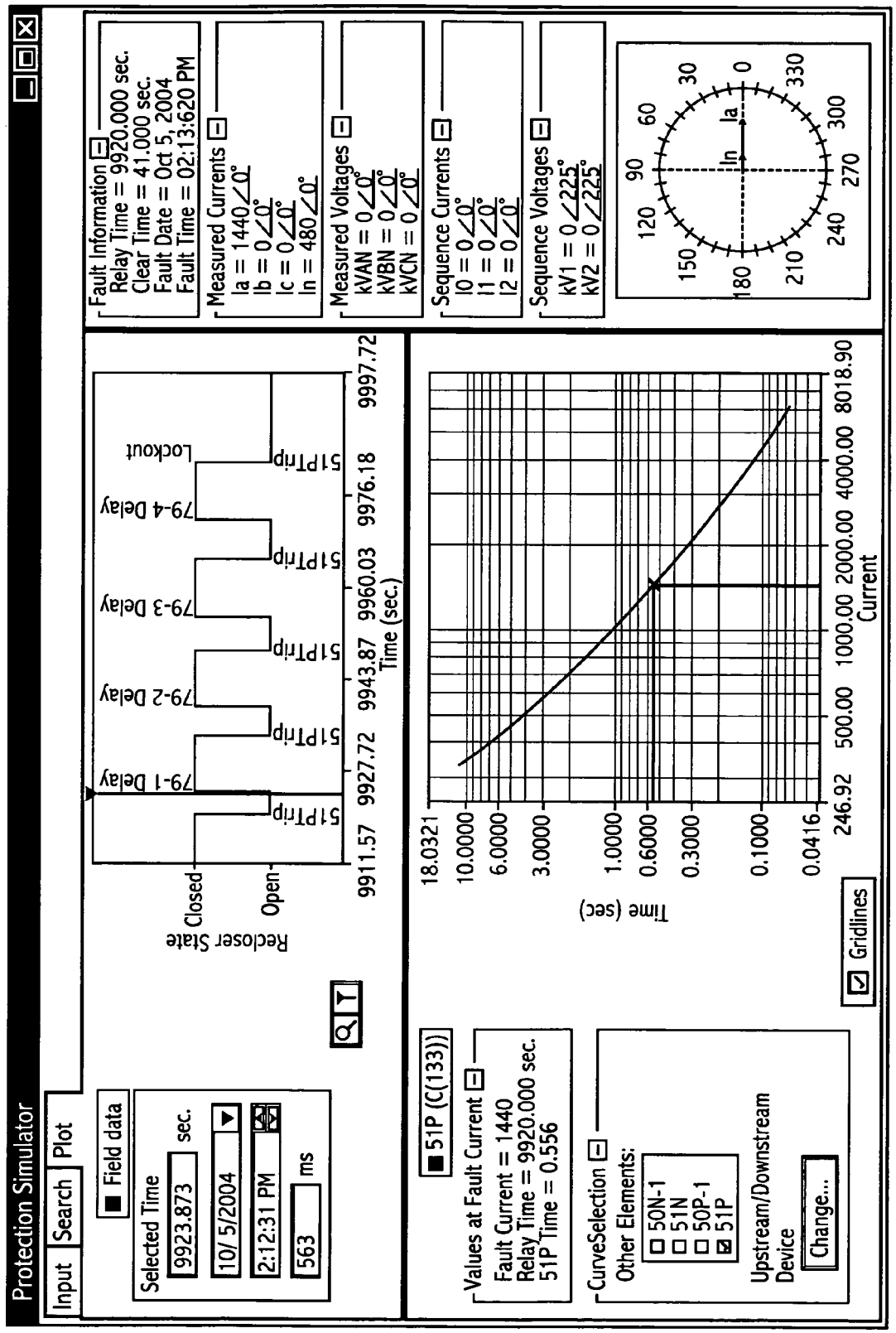
FIG. 13 is a screenshot of an exemplary simulation display and graphical user interface via which the user can select or control a plotting process.

From block 416 control proceeds to block 418 where a determination is made, whether to search for particular terms. For example, the user can be invited to select whether the user desires to search for specific events, and the user's selection can be received. If the determination in block 418 is negative (e.g., the user selects not to search), then control proceeds from block 418 directly to block 422. If the determination is yes, then control proceeds to block 420 wherein search facilities are provided to the user and a search is performed. FIG. 12 is a screenshot illustrating an exemplary graphical user interface of a search facility or function. The search facilities can for example include a graphical user interface that provides menu selections and/or prompts the user for search criteria such as date, event type, associated elements, and so forth. From block 420, control proceeds to block 422. In block 422, event records are displayed, for example via a menu or list which can include search results from block 420, and user selections from the displayed list(s) or menu(s) are received as well as plot instructions or selections provided by the user. For example, a graphic user interface of the simulation/viewing module can provide a selection or menu of graphs, plots, etc. for the user to browse and select. The plots can include for example protection curves that indicate what happens with respect to a specific event, or simulate what would happen in response to a specific event. FIG. 13 is a screenshot of an exemplary graphical user interface and simulation display, via which the user can select or control a plotting process.

From block 422, control proceeds to block 424 wherein the simulation/viewing module displays a simulated state of the IED or PCD (e.g., a recloser, programmable switch, etc.), protection curve plots, and phasor diagram plots. From block 424 control proceeds to block 426 wherein commands are received from the user to display analysis of the event at different points in time. For example, the user can provide the commands by moving a cursor within the graphical user interface, by manually entering or numerically specifying a particular point in time or time span/interval, and so forth. The requested analysis can be also be displayed in block 426. From block 426, control proceeds to block 428 wherein the user is queried as to whether the user desires to view another event. If a positive response is received from the user, then control returns from block 428 to block 416. If the user's response is negative, then control proceeds from block 428 to block 430 where the process ends.

Figure 5:
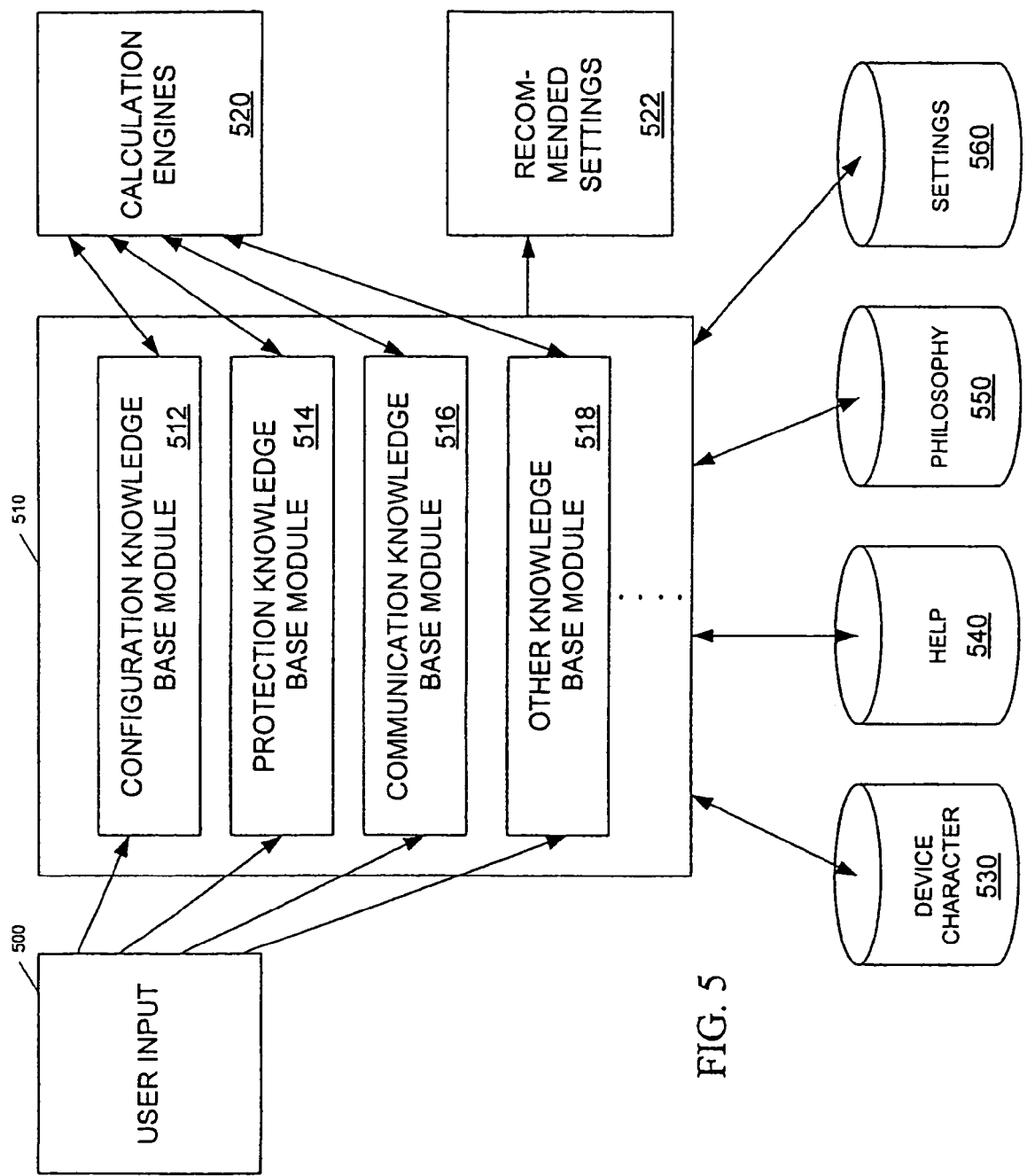
FIG. 5 illustrates an exemplary structure of a recloser configurator.

FIG. 5 shows the components of an exemplary embodiment of a configuration tool. The automated intelligent configuration tool includes an expert system 510 with knowledge-based rules that are applied to the inputs 500 entered by the user. The intelligent configuration tool contains knowledge-based rule sets 512, 514, 516, 518, databases 530, 540, 550, 560, and calculation engines 520, used to set communications, protective coordination, etc., and whose GUI screens change based on user input 500. The knowledge-based modules 512, 514, 516, 518 receive the inputs, follow the rules set in the knowledge-based modules by accessing the databases 530, 540, 550 560 and calculation engines 520, and generates a web-based output settings file 522.

The calculation engines 520 include a plurality of engines such as a protection coordination engine, a coordination simulation engine and a programmable I/O mapping engine.

The protection coordination engine determines which overcurrent protection curves and settings should be programmed in the recloser's controller. The protection coordination engine performs protection coordination between reclosers, fuses and multiple reclosers. Curve timing coordination is based on preset parameters. The coordination simulation engine shows the sequence of events that would occur with current protection settings for a specific fault current that is entered by the user. This provides a logical check on the protection settings. The programmable I/O mapping engine performs mapping operations for the user's inputs to configure the programmable logic in the recloser controller for various functions such as hot line tagging and over-voltage trip and reclose. Additional calculation engines may be part of the configuration tool and are considered as part of the present invention.

The databases depicted in FIG. 5 include a device characteristic database 530, a protection philosophy attribute database 550, a settings information database 560, and a help information database 540. Other databases such as previously-entered user data can be a functional component of the intelligent configuration tool.

The methods, logics, techniques and pseudocode sequences described above can be implemented in a variety of programming styles (for example Structured Programming, Object-Oriented Programming, and so forth) and in a variety of different programming languages (for example Java, C, C++, C#, Pascal, Ada, and so forth).

Those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Devices and modules described herein can be implemented in hardware and/or software or computer program(s) at any desired or appropriate location, for example by specialized circuits or circuitry such as discrete logic gates interconnected to perform a specialized function, by program instruction executed on one or more processors, and so forth. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes. Exemplary machine readable mediums include floppy disks, flash memory, random-access memory (RAM), read only memory (ROM), hard disk drives, punch cards, paper or mylar or other surface having machine-readable markings, CD ROMs, DVDs, and so forth. The information on or in the medium can embodied in one or more various forms including electronic, magnetic, optical, electromagnetic, infrared, and so forth. A machine-readable medium can be any medium that can contain, store, communicate, propagate, or transfer a computer program for use by, or in connection with, an instruction execution system, apparatus or device.

The terms "comprising", "including", and "having" are intended to specify the presence of stated features, steps or components, but do not preclude the presence of additional features, steps or components and are thus open-ended and not exclusive.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A method implemented by a computer for configuring an intelligent electronic device in a power delivery system, comprising:
   receiving identification data for the intelligent electronic device;
   based on the received identification data and on capabilities of the intelligent electronic device, generating a configuration profile for the intelligent electronic device;
   displaying a list of faults;
   receiving a selection of one of the faults from a user;
   simulating the intelligent electronic device's response to the selected fault based on the configuration profile;
   displaying the intelligent electronic device's simulated response and associated event characteristics;
   receiving operating parameters for the intelligent electronic device from a user;
   determining a coordination of the intelligent electronic device with the power delivery system based on the received operating parameters;
   displaying the determined coordination;
   modifying the configuration profile based on the received operating parameters and the determined coordination; and
   configuring the intelligent electronic device with the modified configuration profile.

2. The method of claim 1, wherein the generated configuration profile is a default configuration profile.

3. The method of claim 1, comprising: receiving authorization from the user before configuring the intelligent electronic device with the configuration profile.

4. The method of claim 1, wherein the step of simulating the intelligent electronic device's response comprises:
   receiving selections of source files for fault and operations records and directories for settings data of the intelligent electronic device;
   obtaining device curve data based on the settings data;
   parsing the selected fault and operations records source files; and
   correlating fault and operations records to create events records; and
   wherein the step of displaying the simulated response and associated event characteristics comprises displaying the events records.

5. The method of claim 4, wherein the simulating comprises receiving a selection of a specific event record, and the displaying comprises displaying data for the intelligent electronic device with respect to the selected specific event record.

6. The method of claim 5 wherein the simulating comprises receiving a selection of a time point in a timeline of the specific event of the specific event record; and the displaying comprises displaying data for the intelligent electronic device with respect to the selected time point.

7. The method of claim 1, comprising prompting a user for operating parameters for the intelligent electronic device.

8. The method of claim 7, wherein the prompting comprises providing the user with parameters and parameter values to choose from.

9. A control system for configuring an intelligent electronic device in a power delivery system, comprising:

a computer programmed to perform a method comprising:
receiving information identifying the intelligent electronic device and its capabilities,
generating a configuration profile for the intelligent electronic device based on the received information,
displaying a list of faults;
receiving a selection of one of the faults from a user;
simulating the intelligent electronic device's response to the selected fault based on the configuration profile;
displaying the intelligent electronic device's simulated response and associated event characteristics;
receiving operating parameters of the intelligent electronic device from a user,
determining a coordination of the intelligent electronic device with the power delivery system based on the received operating parameters,
configuring the intelligent electronic device with the configuration profile;
displaying the determined coordination;
modifying the configuration profile based on the received operating parameters and the determined coordination; and
configuring the intelligent electronic device with the modified configuration profile.

10. The control system of claim 9, wherein the method further comprises receiving authorization from the user before the intelligent electronic device is configured with the configuration profile.

11. The control system of claim 7, wherein the computer comprises a graphical user interface and wherein the operating parameters are received through the graphical user interface.

12. The control system of claim 7, wherein the power delivery system comprises multiple intelligent electronic devices and the method further comprises configuring the intelligent electronic devices to communicate with each other and isolate distribution fault.

13. The control system of claim 12, wherein the method further comprises configuring the intelligent electronic devices to monitor reclosers installed in series between substation feeder circuits of the power delivery system and in the event of a fault in power delivery system operate the reclosers to isolate the fault.

14. The control system of claim 9, wherein in the method, the step of simulating the intelligent electronic device's response comprises:
receiving selections of source files for fault and operations records and directories for settings data of the intelligent electronic device;
obtaining device curve data based on the settings data;
parsing the selected fault and operations records source files; and
correlating fault and operations records to create events records; and wherein in the method, the step of displaying the simulated response and associated event characteristics comprises displaying the events records.

15. The system of claim 14, wherein the setting data is in extensible Markup Language format.

16. The system of claim 14, wherein in the method, the step of simulating the intelligent electronic device's response further comprises:
receiving a selection of a specific event record; and
displaying data for the intelligent electronic device with respect to the selected specific event record.

17. The system of claim 16, wherein in the method, the step of simulating the intelligent electronic device's response further comprises:
receiving a selection of a time point in a timeline of the specific event of the specific event record; and
displaying data for the intelligent electronic device with respect to the selected time point.

18. A tangible computer-readable medium comprising machine-readable instructions for causing a computer to perform a method comprising:
receiving identification data for the intelligent electronic device;
based on the received identification data and on capabilities of the intelligent electronic device, generating a configuration profile for the intelligent electronic device;
displaying a list of faults;
receiving a selection of one of the faults from a user;
simulating the intelligent electronic device's response to the selected fault based on the configuration profile;
displaying the intelligent electronic device's simulated response and associated event characteristics;
receiving operating parameters for the intelligent electronic device from a user;
determining a coordination of the intelligent electronic device with the power delivery system based on the received operating parameters;
displaying the determined coordination;
modifying the configuration profile based on the received operating parameters and the determined coordination; and
configuring the intelligent electronic device with the modified configuration profile.

19. The method of claim 1, further comprising querying the intelligent electronic device for the identification data.

20. The method of claim 1, wherein the steps of displaying a list of faults, receiving a selection of one of the faults, simulating the intelligent electronic device's response to the selected fault based on the configuration profile, and displaying the simulated response and associated event characteristics are performed concurrently with other steps of the method.

* * * * *